United States Patent [19]

Weaver

[11] 4,278,015
[45] Jul. 14, 1981

[54] MATERIAL HANDLING APPARATUS

[75] Inventor: Richard A. Weaver, Linden, Mich.

[73] Assignee: Fluid and Electric Control Company, Fenton, Mich.

[21] Appl. No.: 156,557

[22] Filed: Jun. 5, 1980

[51] Int. Cl.³ .............................................. B30B 15/30
[52] U.S. Cl. ........................................ 100/53; 72/419; 83/DIG. 1; 100/215; 294/86 R
[58] Field of Search ................... 72/419; 414/749, 751; 294/19 R, 86 R; 100/53, 207, 214, 215; 83/401, DIG. 1

[56] References Cited

U.S. PATENT DOCUMENTS

| | | | |
|---|---|---|---|
| 3,394,650 | 7/1968 | Cagle | 100/53 |
| 4,134,334 | 1/1979 | Johnson | 100/53 |

FOREIGN PATENT DOCUMENTS

| | | | |
|---|---|---|---|
| 896503 | 5/1962 | United Kingdom | 100/53 |
| 1021642 | 3/1966 | United Kingdom | 100/53 |

Primary Examiner—Billy J. Wilhite
Attorney, Agent, or Firm—Learman & McCulloch

[57] ABSTRACT

A manually manipulatable device for adjusting the position of a workpiece supported on a machine having relatively movable parts operated by electrically controlled, selectively energizable and deenergizable driving means comprises an elongate arm having a workpiece engageable fork at one end and a support at its other end for manipulation by an operator. The support preferably is pistol-shaped having a grip at one end and a barrel at its other end. The support includes two normally open, manually closable electrical switches in circuit with the machine's driving means to effect energization of the latter under the control of the workpiece manipulating device, but only when both of the switches are closed. The switches are spaced apart from one another a distance greater than that which can be spanned by the fingers of one hand of the operator, thereby preventing closing of both switches unless the operator's hands are on the support. The workpiece engageable fork and the support are spaced apart a distance sufficient to ensure that, when the fork engages the workpiece, the support is spaced from the machine a distance sufficient to ensure that the machine operator's hands are outside the machine.

14 Claims, 7 Drawing Figures

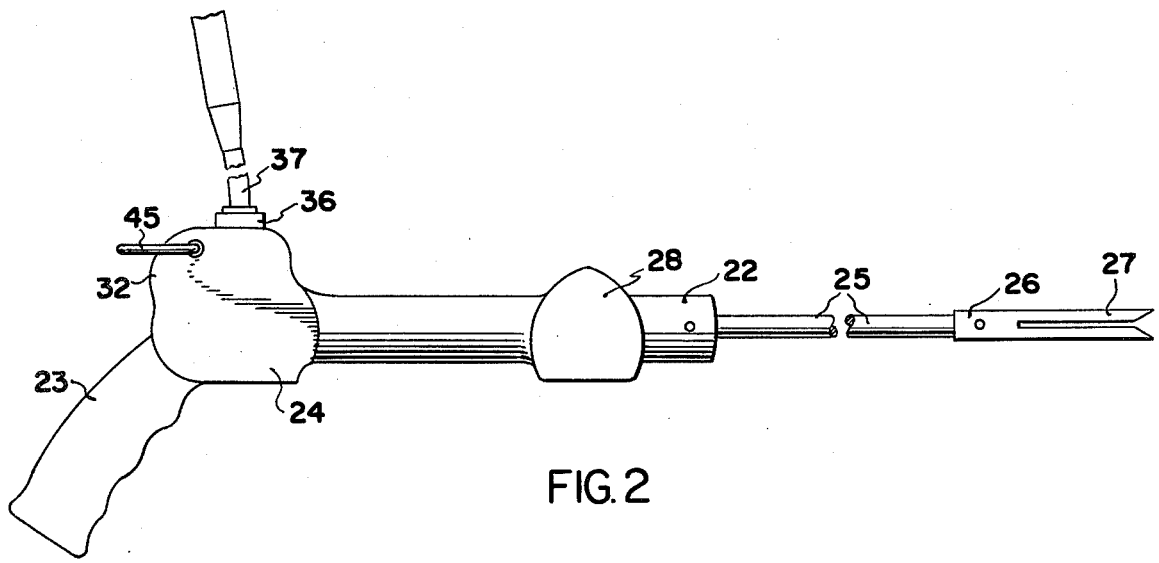
FIG. 2
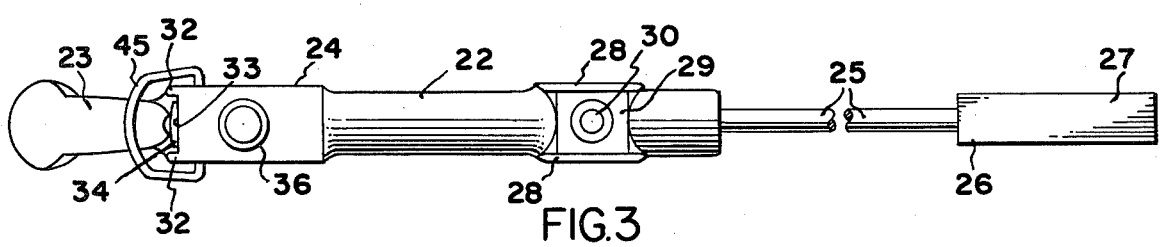
FIG. 3
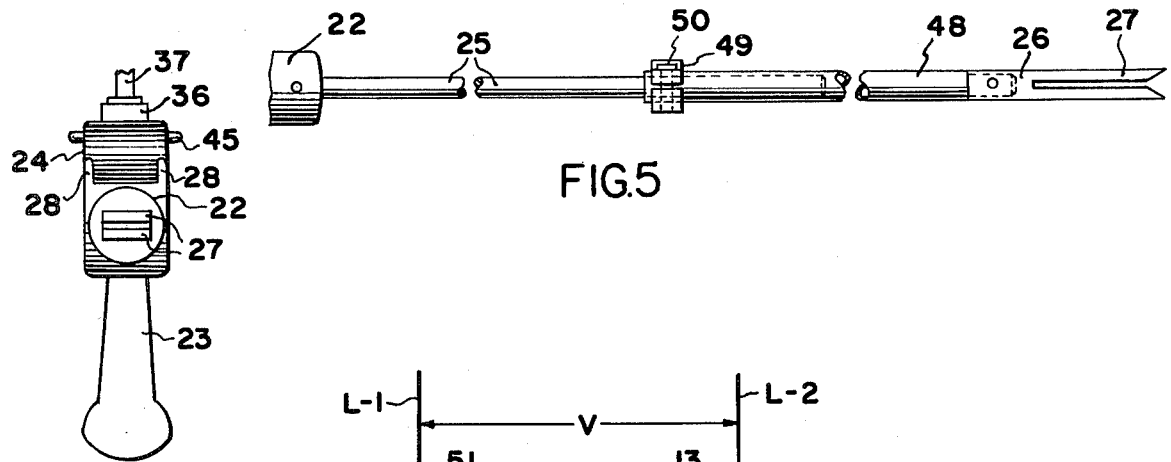
FIG. 5
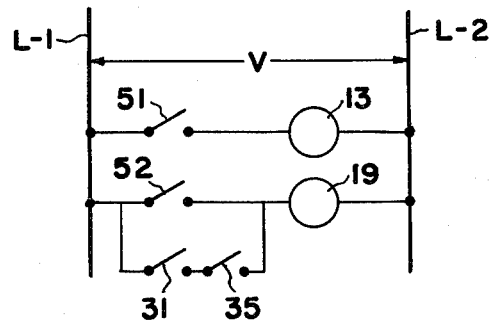
FIG. 4
FIG. 6

MATERIAL HANDLING APPARATUS

BACKGROUND OF THE INVENTION

There are many kinds of industrial machines having components which move relatively toward and away from one another during operation to perform one of a number of operations on a workpiece supported between the relatively movable components. Examples of such machinery are punch presses, forming and drawing die presses, and progressive die machines. In all of such machinery it is conventional practice, prior to commencing a production run, for the machine operator to adjust the relatively movable die members or the like for proper registration, manually place a workpiece in position between the relatively movable parts, and cycle the machine under manual control to verify proper adjustment of the relatively movable parts.

In the case of a progressive die machine there conventionally is a plurality of pairs of die members spaced along a path that is to be traversed by a strip or ribbon of workpiece-forming material. Each pair of relatively movable dies constitutes a work or forming station and it is conventional for the ribbon material to be unwound from a reel, advanced incrementally into each station, and rewound on a second reel.

Preparatory to commencing a production run of a progressive die machine, the die registration steps referred to earlier are performed at each station. In addition, the leading end of a ribbon of material conventionally is advanced by hand to each successive station during the preliminary machine setup operation. Further, when one reel of ribbon material has been exhausted following a production run, it is conventional for the leading end of a fresh ribbon material to be moved manually incrementally from station to station preparatory to automatic operation of the machine.

In each of the foregoing cases the operator of a machine is exposed to substantial risk of injury in the event the relatively movable parts of the machine are caused to move while one or the other of the operator's hands is within the machine. Such risk is increased in those instances in which the operator is weary or becomes careless.

An object of the present invention is to provide apparatus capable of manipulating a workpiece supported by a machine and which is constructed in such manner as to ensure that the machine cannot be cycled unless both hands of the operator are positioned on the manipulating apparatus and in a safe position external of the machine.

SUMMARY OF THE INVENTION

Apparatus constructed in accordance with the invention comprises an elongate device having at one end a workpiece engageable and manipulating member and at the other end a support. The support has a pair of normally open, manually closable switches in circuit with the driving mechanism of a machine, both of which switches must be held in their closed positions before the machine driving mechanism can be energized. The two switches are spaced from one another a distance incapable of being spanned by the fingers of one hand of an operator and are located in recessed or depressed areas to preclude inadvertent closing of either switch. The construction and arrangement of the apparatus are such that closing of the switches requires a deliberate act and requires the use of both hands of an operator, thereby avoiding the possibility that an operator's hand will be exposed to the risk of injury during use of the workpiece manipulating apparatus.

DESCRIPTION OF THE DRAWINGS

Apparatus constructed in accordance with the preferred embodiment of the invention is illustrated in the accompanying drawings, wherein:

FIG. 1A is a fragmentary, side elevational view of a typical progressive die machine;

FIG. 2 is a fragmentary, side elevational view, on an enlarged scale, of the workpiece manipulating apparatus;

FIG. 3 is a top plan view of the apparatus shown in FIG. 2;

FIG. 4 is an end elevational view of the apparatus;

FIG. 5 is a fragmentary, top plan view similar to FIG. 2, but illustrating a modification; and FIG. 6 is a highly simplified, schematic, electrical diagram.

DETAILED DESCRIPTION

Figure 1:
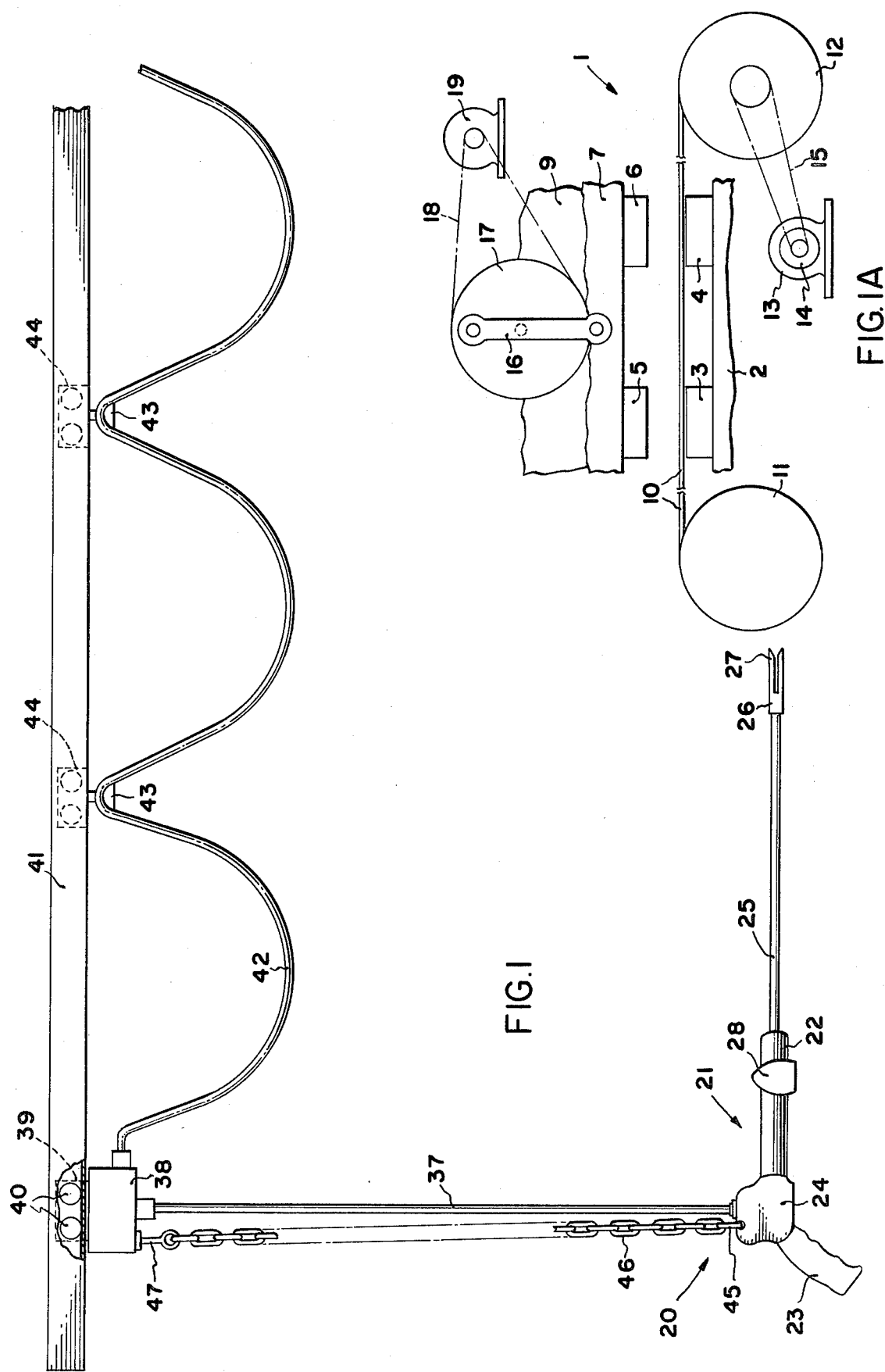
FIG. 1 is a fragmentary, side elevational view illustrating apparatus for manipulating a workpiece.

Apparatus constructed in accordance with the invention is adapted for use with a number of different kinds of machinery and is disclosed as being used in conjunction with a progressive die machine 1 including an elongate base 2 having a number of successive, progressive die members 3 and 4. Above each die member 3 and 4 is a mating die member 5 and 6, respectively, carried by a vertically movable platen 7 supported on a frame 9. Each pair of die members 3,5 and 4,6 forms a work station.

Extending longitudinally of the machine 1 and spanning the work stations is a ribbon or strip of steel, aluminum, brass, or other material, which will be acted on by the die set at each work station to form the material into an article of manufacture. Conventionally, the material 10 is wound on a reel 11 from which the leading end is extended and rewound on another reel 12 following movement of the material from one end of the machine 1 to the other. The reel 12 conventionally is driven by an electric motor 13 via an incremental transmission 14 and a drive belt 15. The motor 13, when energized, operates continuously and the transmission 14 imparts rotation to the reel 12 in successive increments to advance the material step by step to each of the work stations.

The reciprocable platen 7 may be connected by an arm 16 to a crank 17 journaled on the frame 9 and coupled by a belt 18 to an electric motor 19 which is energizable and deenergizable in a manner subsequently to be described. The motors 13 and 19 are synchornized in such manner that each time the die sets close on the workpiece 10, the latter will have been indexed the distance between adjacent work stations, as is well known in the art.

During initial setup operations of the progressive die machine 1, or when a fresh strip 10 of material is to be conditioned for forming operations, it is conventional for the machine operator to introduce the leading end of the strip 10 to the first work station, energize the motor 19 to effect one cycle of operation of the platen 7, manually advance the strip to the next work station, recycle the platen 7, and so on until the leading end of the strip may be coupled to the rewinding reel 12. During these operations, the hands of the machine operator repeatedly will be placed in hazardous positions and severe injury to the operator may result if the platen is actuated inadvertently or intentionally.

Apparatus constructed in accordance with the preferred embodiment of the invention is designated generally by a reference character 20 and comprises a manually portable support 21 of pistol configuration having a barrel 22 joined at one end to a grip 23 by means of a housing 24. The barrel 22 is provided with a socket in which is fixed one end of an elongate rod 25 terminating at its opposite end in a workpiece engaging fork 26 having stiff, but resilient, tynes 27.

Between the outer end of the barrel 22 and the housing 24 is a pair of upstanding, spaced apart walls or ribs 28 which project above the surface of the barrel and thus provide a recess or depression 29. Fitted into an opening formed in the barrel at the recess 29 is a depressable push button 30 that is projected outwardly by a spring (not shown). The barrel 22 is hollow to accommodate a switch 31 (FIG. 6) having normally open contacts which close in response to depression of the push button 30 and which reopen upon release of the push button.

The housing 24 is provided at its rear end with rearwardly extending, spaced apart ribs 32 defining a depression or recess 33 therebetween. Fitted into an opening at the base of the recess 33 is a push button 34 similar in all respect to the push button 30 and which, upon depression thereof, is operable to close the contacts of a normally open switch 35 accommodated in the housing 24. The switches 31 and 35 are connected in series.

The housing 24 and the barrel 22 are provided with passages therein for the accommodation of electrically conductive wires that emerge from the housing 24 via a coupling 36 to which is joined one end of an electrical cable 37, the opposite end of which is connected to a junction box 38. The junction box is suspended from a trolley 39 having wheels 40 which ride upon an overhead rail 41 that extends above and parallel to the length of the machine 1. The junction box 38 also is connected to one end of a cable 42, the opposite end of which is connected to a source of electrical energy. The cable 42 preferably is supported at intervals on hangers 43 suspended from wheeled trolleys 44 like the trolley 39.

The housing 24 preferably includes a swivelable loop 45 to which one end of a chain 46 is connected, the opposite end of the chain being connected to a fitting 47 carried by the junction box 38. The apparatus 20 thus is suspended from the overhead rail 41 and is manually adjustable along the rail for the full length of the machine 1.

If desired, the workpiece engageable fork 26, rather than being fixed directly to the free end of the rod 25, may be fixed to a sleeve 48 as shown in FIG. 5, and which telescopingly accommodates the rod 25 so as to enable the distance between the fork 26 and the support barrel 22 to be adjusted. A split clamp 49 encircles the sleeve 48 and is provided with an adjusting screw 50 which may be adjusted to secure the sleeve 48 in any one of a number of adjusted positions relative to the rod 25.

As is illustrated in the simplified wiring diagram of FIG. 6, the motor 13 for indexing the workpiece 10 incrementally relative to the machine 1 is connected to two electrical power lines L-1 and L-2 via a control switch 51. The driving motor 19 for the platen 7 is connected to the power lines via a control switch 52, such switch being bridged by the switches 31 and 35.

When it is desired to condition the machine 1 for operation, the leading end of the strip 10 is led from the reel 11 toward the machine 1. The machine operator grasps the grip 23 of the manipulating device 20 and fits the edge of the strip between the tynes 27 of the fork 26. The operator then may feed the leading end of the strip between the die members 3 and 5 at the first work station. Upon closing of both of the switches 31 and 35, the motor 19 will be energized to effect a cycle of operation of the die sets so as to perform a first forming operation on the leading end of the strip 10. Thereafter, the operator may index the strip 10 manually through each of the remaining work stations, effecting cycling of the platen following indexing of the strip 10 to each station, until the leading end of the strip has been indexed the full length of the machine 1 and is secured to the rewinding reel 12. Thereafter, the machine may be conditioned for automatic operation by closing of the switches 51 and 52.

An important characteristic of the invention is that the switches 31 and 35 carried by the support 21 are spaced apart a distance greater than can be spanned by the fingers of one hand of the machine operator. Since both of the switches 31 and 35 must be closed to effect operation of the motor 19 when the switch 52 is open, it is essential that both hands of the operator be on the support 21 to effect simultaneous closing of the switches 31 and 35. As a consequence, the likelihood that an operator's hand will be within the machine 1 and exposed to injury is extremely remote.

The recessing of the switch-operating push buttons in the depressions or recesses 29 and 33 contributes to operator safety by minimizing the likelihood that either of the push buttons may be depressed to switch-closing position inadvertently.

The disclosed embodiment is representative of a preferred form of the invention, but is intended to be illustrative rather than definitive thereof. The invention is defined in the claims.

I claim:

1. Material handling apparatus for use with a machine of the kind having selectively energizable and deenergizable electrical driving means and control means for selectively enabling and disabling energization of said driving means, said apparatus comprising a manually manipulative arm having at one end thereof means for engaging a workpiece carried by said machine; support means connected to said arm remote from said one end; and at least a pair of normally open, manually closable electrical switches in circuit with said driving means and carried by said support means, said switches being operable independently of said control means to enable operation of said driving means in response to closing of all of said switches.

2. Apparatus according to claim 1 wherein said switches are spaced from one another a distance greater than that which can be spanned by the fingers of a person's hand.

3. Apparatus according to claim 1 wherein at least one of said switches is located in a depression formed in said support means.

4. Apparatus according to claim 1 wherein each of said switches is located in a depression formed in said support means.

5. Apparatus according to claim 1 wherein said support means comprises a tubular barrel joined at one end to a pistol grip, one of said switches being located at the juncture of said barrel and said pistol grip.

6. Apparatus according to claim 5 wherein another of said switches is carried by said barrel remote from said pistol grip.

7. Apparatus according to claim 1 wherein said means for engaging a workpiece comprises a fork.

8. Apparatus according to claim 7 wherein said fork has resilient tynes.

9. Apparatus according to claim 1 wherein said arm is adjustable in length, and including means for selectively enabling and disabling lengthwise adjustment of said arm.

10. Workpiece manipulating apparatus comprising a support; means carried by said support for engaging a workpiece; and a pair of spaced apart electrical switches connected in series and carried by said support, the spacing between said switches being greater than the distance that can be spanned by the fingers of a person's hand.

11. Apparatus according to claim 10 wherein each of said switches is normally open.

12. Apparatus according to claim 10 wherein the means for engaging a workpiece includes a fork having resilient tynes.

13. Apparatus according to claim 10 wherein each of said switches is recessed in said support.

14. Apparatus according to claim 10 wherein the means for engaging a workpiece is adjustable in length.

* * * * *